US010761987B2

(12) United States Patent
Jalal et al.

(10) Patent No.: US 10,761,987 B2
(45) Date of Patent: Sep. 1, 2020

(54) APPARATUS AND METHOD FOR PROCESSING AN OWNERSHIP UPGRADE REQUEST FOR CACHED DATA THAT IS ISSUED IN RELATION TO A CONDITIONAL STORE OPERATION

(71) Applicant: Arm Limited, Cambridge (GB)

(72) Inventors: Jamshed Jalal, Austin, TX (US); Mark David Werkheiser, Austin, TX (US); Michael Filippo, Driftwood, TX (US); Klas Magnus Bruce, Leander, TX (US); Paul Gilbert Meyer, Rollingwood, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/202,171

(22) Filed: Nov. 28, 2018

(65) Prior Publication Data

US 2020/0167284 A1 May 28, 2020

(51) Int. Cl.
*G06F 12/0815* (2016.01)
*G06F 13/16* (2006.01)

(52) U.S. Cl.
CPC ...... *G06F 12/0815* (2013.01); *G06F 13/1668* (2013.01); *G06F 2212/1032* (2013.01)

(58) Field of Classification Search
CPC .................................................. G06F 12/0815
See application file for complete search history.

(56) References Cited

U.S. PATENT DOCUMENTS

2007/0043913 A1\* 2/2007 Hetherington ...... G06F 12/0813
711/141

2008/0320231 A1\* 12/2008 Kinter ................ G06F 12/0833
711/141

\* cited by examiner

*Primary Examiner* — Edward J Dudek, Jr.
(74) *Attorney, Agent, or Firm* — Nixon & Vanderhye P.C.

(57) ABSTRACT

An apparatus and method are provided for processing ownership upgrade requests in relation to cached data. The apparatus has a plurality of processing units, at least some of which have associated cache storage. A coherent interconnect couples the plurality of master units with memory, the coherent interconnect having a snoop unit used to implement a cache coherency protocol when a request received by the coherent interconnect identifies a cacheable memory address within the memory. Contention management circuitry is provided to control contended access to a memory address by two or more processing units within the plurality of processing units. The coherent interconnect may receive, from a first processing unit having an associated cache storage, an ownership upgrade request specifying a target memory address, the ownership upgrade request indicating that a copy of data at the target memory address, as held in a shared state in the first processing unit's associated cache storage at a time the ownership upgrade request was issued, is required to have its state changed from the shared state to a unique state prior to the first processing circuitry performing a write operation to the data. The coherent interconnect is arranged to process the ownership upgrade request by referencing the snoop unit in order to determine whether the first processing unit's associated cache storage is identified as still holding a copy of the data at the target memory address at a time the ownership upgrade request is processed. In that event, a pass condition is identified for the ownership upgrade request independent of information held by the contention management circuitry for the target memory address.

17 Claims, 13 Drawing Sheets

LOCAL MONITOR (ONE PER PROCESSING UNIT)

GLOBAL MONITOR

APPARATUS AND METHOD FOR PROCESSING AN OWNERSHIP UPGRADE REQUEST FOR CACHED DATA THAT IS ISSUED IN RELATION TO A CONDITIONAL STORE OPERATION

BACKGROUND

The present technique relates to an apparatus and method for processing an ownership upgrade request for cached data, where the ownership upgrade request is issued in relation to a conditional store operation.

A system may include a plurality of processing units that are coupled to memory via an interconnect structure. Within such systems, a mechanism may be provided to enable one of the processing units to obtain exclusive access to a memory location. In particular, the instructions executed by a processing unit may include an exclusive sequence that employs a load instruction in order to read the value of a memory location, and subsequently employs a conditional store instruction that will conditionally write an updated value to the same memory location. Such a load instruction and associated conditional store instruction may be referred to as a load-link and store-conditional (LL/SC) pair of instructions. When executing an exclusive sequence having a LL/SC pair of instructions, the store instruction will only write to the memory location if it is determined that the processing unit does have exclusive access to that memory location at the time the write operation is to be performed, and otherwise the write operation will not be performed, and the exclusive sequence will fail. When the exclusive sequence fails, then the processing unit will need to repeat the exclusive sequence of instructions in order to seek to reperform the access and update of the memory location.

Contention management circuitry may be provided within the system to seek to control contended access to a memory location by two or more of the processing units, and in particular to take steps to avoid livelock situations arising when there is such contended access.

When an exclusive sequence of instructions is executed in relation to a memory location that is cacheable, then the loaded data will typically be stored within the processing unit's cache. The other processing units may also have local cache structures, and a cache coherency protocol can be employed within the system to seek to ensure that each processing device is able to access the most up-to-date version of the data being maintained within the system.

When during performance of the earlier-mentioned exclusive sequence a processing unit executes the conditional store instruction to seek to update the memory location, and it is determined that the copy of the relevant data as held in its local cache is not currently in the unique state (i.e. one or more other processing units may also be caching a local copy of that data), then the processing unit may issue an ownership upgrade request to the interconnect to seek permission to hold that data in the unique state in its local cache, so that it can then perform the write operation in the knowledge that it has exclusive access to the relevant memory location.

In existing systems, the contention management circuitry is referred to at that point, since the ownership upgrade request should fail if there is contended access for the memory location.

However, it has been observed that in current systems this approach can lead to the ownership upgrade request failing unnecessarily, resulting in the exclusive sequence needing to be retried, and a resultant increase in the number of transactions taking place in the interconnect.

Accordingly, it would be desirable to provide an improved mechanism for processing ownership upgrade requests in relation to cached data.

SUMMARY

In one example arrangement, there is provided an apparatus comprising: a plurality of processing units, where multiple processing units of the plurality have associated cache storage; a coherent interconnect used to couple the plurality of processing units with a memory, the coherent interconnect comprising a snoop unit used to implement a cache coherency protocol when a request received by the coherent interconnect identifies a cacheable memory address within the memory; and contention management circuitry used to control contended access to a memory address by two or more processing units within the plurality of processing units; the coherent interconnect being arranged to receive, from a first processing unit having an associated cache storage, an ownership upgrade request specifying a target memory address, the ownership upgrade request indicating that a copy of data at the target memory address, as held in a shared state in the first processing unit's associated cache storage at a time the ownership upgrade request was issued, is required to have its state changed from the shared state to a unique state prior to the first processing circuitry performing a write operation to the data; the coherent interconnect being arranged to process the ownership upgrade request by referencing the snoop unit in order to determine whether the first processing unit's associated cache storage is identified as still holding a copy of the data at the target memory address at a time the ownership upgrade request is processed, and in that event to identify a pass condition for the ownership upgrade request independent of information held by the contention management circuitry for the target memory address.

In another example arrangement, there is provided an apparatus comprising: a coherent interconnect used to couple a plurality of processing units with a memory, multiple processing units of the plurality having associated cache storage; a snoop unit used to implement a cache coherency protocol when a request received by the coherent interconnect identifies a cacheable memory address within the memory; and the coherent interconnect being arranged to receive, from a first processing unit having an associated cache storage, an ownership upgrade request specifying a target memory address, the ownership upgrade request indicating that a copy of data at the target memory address, as held in a shared state in the first processing unit's associated cache storage at a time the ownership upgrade request was issued, is required to have its state changed from the shared state to a unique state prior to the first processing circuitry performing a write operation to the data; the coherent interconnect being arranged to process the ownership upgrade request by referencing the snoop unit in order to determine whether the first processing unit's associated cache storage is identified as still holding a copy of the data at the target memory address at a time the ownership upgrade request is processed, and in that event to identify a pass condition for the ownership upgrade request independent of information held by contention management circuitry for the target memory address, the contention management circuitry being used to control contended access to a memory address by two or more processing units within the plurality of processing units.

In a still further example arrangement, there is provided a method of operating an apparatus that has a plurality of processing units, where multiple processing units of the plurality have associated cache storage, and a coherent interconnect used to couple the plurality of processing units with a memory, comprising: employing a snoop unit within the coherent interconnect to implement a cache coherency protocol when a request received by the coherent interconnect identifies a cacheable memory address within the memory; employing contention management circuitry to control contended access to a memory address by two or more processing units within the plurality of processing units; receiving at the coherent interconnect, from a first processing unit having an associated cache storage, an ownership upgrade request specifying a target memory address, the ownership upgrade request indicating that a copy of data at the target memory address, as held in a shared state in the first processing unit's associated cache storage at a time the ownership upgrade request was issued, is required to have its state changed from the shared state to a unique state prior to the first processing circuitry performing a write operation to the data; and processing the ownership upgrade request by referencing the snoop unit in order to determine whether the first processing unit's associated cache storage is identified as still holding a copy of the data at the target memory address at a time the ownership upgrade request is processed, and in that event identifying a pass condition for the ownership upgrade request independent of information held by the contention management circuitry for the target memory address.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
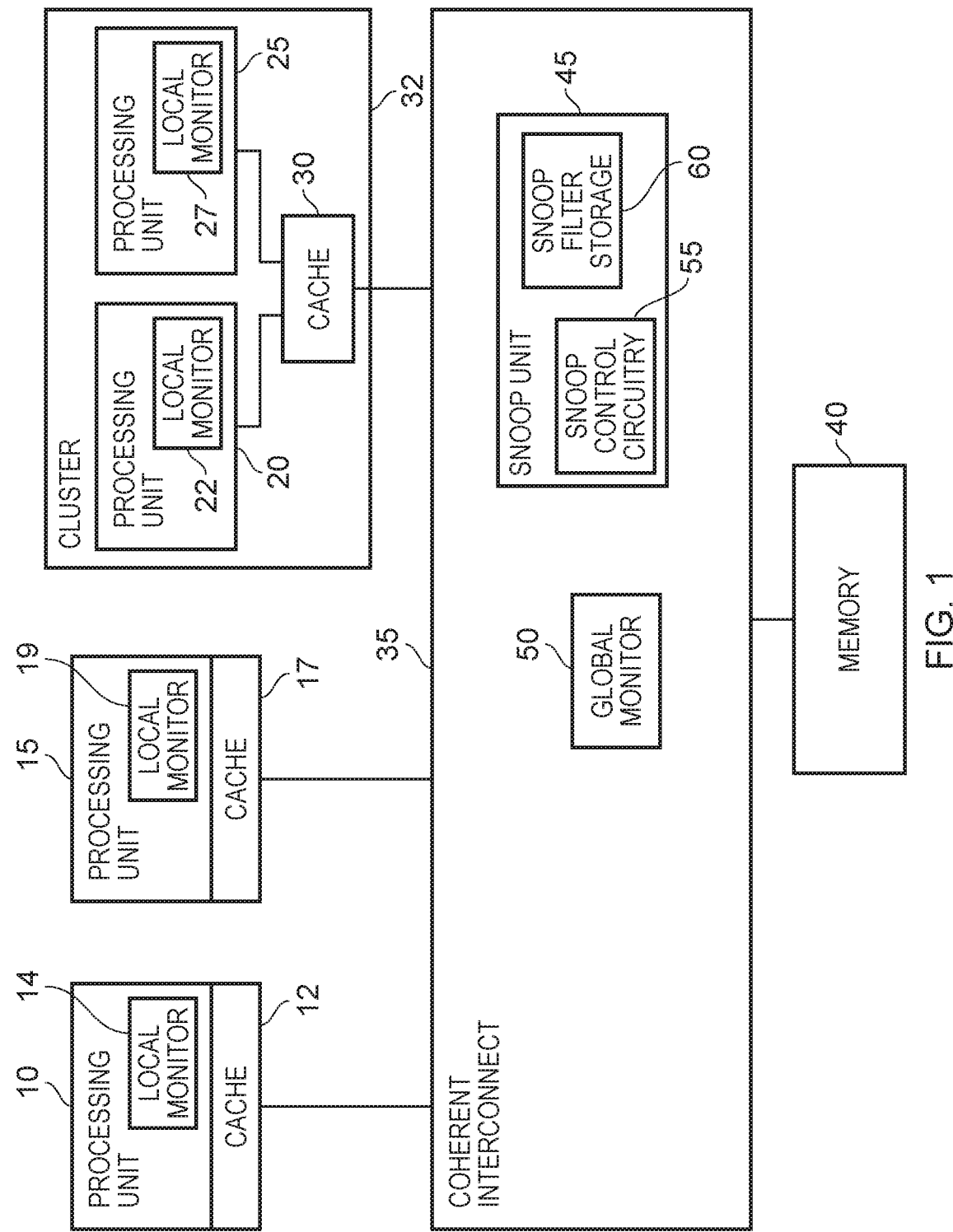
FIG. 1 is a block diagram of a system in accordance with one example arrangement.

An apparatus is provided that has a plurality of processing units, where multiple (but not necessarily all) of those processing units have associated cache storage. A coherent interconnect is provided to couple the plurality of processing units with a memory, the coherent interconnect comprising a snoop unit used to implement a cache coherency protocol when a request received by the coherent interconnect identifies a cacheable memory address within the memory. The apparatus also has contention management circuitry used to control contended access to a memory address by two or more processing units within the plurality of processing units. The contention management circuitry may be used to control contended access to a memory address irrespective of whether the processing units seeking that contended access have associated local cache storage or not.

During execution of a sequence of instructions within a first processing unit, that first processing unit may seek to execute an exclusive sequence of the form discussed earlier, and during that process the coherent interconnect may then receive an ownership upgrade request from that processing unit specifying a target memory address. The ownership upgrade request indicates that a copy of data at the target memory address, as held in a shared state in the first processing unit's associated cache at a time the ownership upgrade request was issued, is required to have its state changed from the shared state to a unique state prior to the first processing circuitry performing a write operation to that data.

In accordance with the techniques described herein, the coherent interconnect is arranged to process such an ownership upgrade request by referencing the snoop unit in order to determine whether the first processing unit's associated cache is identified as still holding a copy of the data at the target memory address at a time the ownership upgrade request is processed. In that event, the coherent interconnect identifies a pass condition for the ownership upgrade request independent of information held by the contention management circuitry for the target memory address.

The inventors realised that by relying on the contention management circuitry when processing such an ownership upgrade request, situations can arise where it is determined that the ownership upgrade request should fail, even though there is in fact no contended access, and hence that fail is a false fail. This is due to the fact that when the load instruction at the start of the exclusive sequence is executed, which may result in a coherent read request being presented to the coherent interconnect if the data is not currently in the first processing unit's cache, the first processing unit can for legitimate reasons not identify that that coherent read request relates to an exclusive sequence, and as a result the state of the contention management circuitry is not updated to a form that would allow a subsequent ownership upgrade request to pass in the absence of any contention, and instead on the first attempt to perform the exclusive sequence the ownership upgrade request would fail, leading to a requirement for the exclusive sequence to be reperformed.

However, the inventors realised that instead the presence or absence of contention in such situations can be determined directly with reference to the contents of the snoop unit. In particular, in situations where there is in fact contention, the first processing unit's cache will no longer hold a local copy of the data in question at the time the ownership upgrade request is processed by the coherent interconnect (since that copy will have been invalidated due to the contended access), and the snoop unit can determine whether the data in question is still present within the first processing unit's cache or not. If it is not present, then the ownership upgrade request fails, but if the data is still present in the first processing unit's cache, then it can be determined that there is in fact no contended access, and the ownership upgrade request can be allowed to pass, thereby enabling the store instruction required to complete the exclusive sequence to be performed.

It has been found that by processing the ownership upgrade request in the above manner, significant performance improvements can be realised, by avoiding the false fails that may arise if the decision as to whether to pass or to fail the ownership upgrade request is taken based on the current state of the contention management circuitry.

In one example, in the presence of the pass condition, the coherent interconnect is arranged to cause the snoop unit to issue an invalidating snoop request to each processing unit, other than the first processing unit, that is identified by the snoop unit as holding a copy of the data at the target memory address, in order to cause each processing unit receiving the snoop invalidate request to invalidate the copy of the data as stored in its associated cache storage. Then the coherent interconnect can issue a response to the first processing unit identifying the pass condition so as to cause the first processing unit to update the state of the copy of the data held in its associated cache storage from the shared state to the unique state. At this point, the write operation required to be performed in respect of the target memory address in order to complete the exclusive sequence can be performed locally within the first processing unit's cache. The update made to the local cached copy may also be propagated out to the memory system if the cache is operating as a write through cache for the address in question. However, if the cache is operating as a write back cache, it is merely necessary to set the dirty bit in association with the relevant cache line, to identify that the cached copy is more up to date than the copy held in memory.

In one example implementation, when, during processing of the ownership upgrade request by the coherent interconnect, the snoop unit determines that the first processing unit's associated cache storage no longer holds a copy of the data at the target memory address, the coherent interconnect is arranged to identify a fail condition for the ownership upgrade request independent of information held by the contention management circuitry for the target memory address. As mentioned earlier, if the first processing unit's cache no longer holds a copy of the data, this implies the presence of a contended access by another processing unit to the same memory address, which will have resulted in a snoop invalidate operation being performed in respect of the first processing unit's associated cache, thus invalidating the first processing unit's cached copy of the data at that target memory address.

The snoop unit can be arranged in a variety of ways. However, in one example implementation, the snoop unit comprises snoop filter storage having a plurality of entries, each snoop filter entry being arranged to identify a memory portion, and to maintain snoop control information indicative of the processing units that have accessed that memory portion. When the snoop unit is referenced by the coherent interconnect during processing of the ownership upgrade request, the snoop unit is arranged, when the target memory address is within the memory portion associated with a snoop filter entry, to reference the snoop control information in that snoop filter entry when determining whether the first processing unit's associated cache storage is identified as still holding a copy of the data at the target memory address.

The snoop control information can take a variety of forms, but in one example arrangement the snoop control information for each snoop filter entry uniquely identifies each processing unit that has access to the associated memory portion. As a result, it can be explicitly determined directly from the snoop control information whether the first processing unit's cache still holds a copy of the data at the target memory address.

However, in an alternative implementation the snoop control information may not uniquely identify each processing unit that has accessed the associated memory portion. For example, it may identify groups of processing units that have or have not accessed the associated memory portion. If the first processing unit is within a group that is marked as having accessed the associated memory portion, then this may mean that one or more of the processing units in the group have accessed the memory portion, but does not explicitly identify that any particular processing unit in that group has accessed the memory portion.

In such situations, the snoop unit may be arranged to issue a snoop query to the first processing unit in order to determine whether the first processing unit's associated cache still holds a copy of the data at the target memory address, with the snoop response provided in reply to that snoop query being used to determine whether to pass or fail the ownership upgrade request.

The contention management circuitry can take a variety of forms, but in one example implementation may comprise at least local monitor circuitry provided for each processing unit. When data is loaded into the associated cache of a processing unit in response to a coherent read request being processed by the coherent interconnect, the local monitor circuitry for that processing unit may be arranged to set an entry within the local monitor circuitry to provide a memory address indication for the loaded data.

In one example implementation, if an exclusive sequence is successfully performed in respect of a memory address identified within an entry of the local monitor circuitry associated with the processing unit that has successfully performed that exclusive sequence, then that entry can be cleared. However, in addition, other events may also cause such an entry to be cleared. For example, in one implementation, when data held in the associated cache storage of a processing unit is invalidated, the local monitor circuitry for that processing unit is arranged to clear any entry within the local monitor circuitry having the memory address indication for that data.

In some implementations, the contention management circuitry may only include the above mentioned local monitor circuits. However, in one example implementation, the contention management circuitry further comprises global monitor circuitry provided in association with the coherent interconnect. When a coherent read request from one of the processing units is processed by the coherent interconnect, and that coherent read request is flagged as being issued in relation to an exclusive sequence of operations performed by that one of the processing units, the global monitor circuitry is arranged to set an entry within the global monitor circuitry to identify that one of the processing units and a target memory address specified by the coherent read request.

However, in certain implementations, under one or more specified conditions, the coherent read request from a processing unit is not flagged as being issued in relation to an exclusive sequence of operations performed by that processing unit, despite the fact that data loaded into the associated cache storage of the processing unit as a result of the coherent read request will be the subject of a write operation during performance of the exclusive sequence of operations. It is for this reason that reliance on the state of the contention management circuitry can be unreliable when processing an ownership upgrade request, and in particular could result in a significant number of false fails.

In some systems, there is no requirement for a coherent read request to flag whether it is being issued in relation to an exclusive sequence of operations. Indeed, correct handling of an exclusive sequence cannot rely on such an exclusive flag in association with the coherent read request, since the data that may be the subject of the exclusive sequence may be brought into the processing unit's cache through a number of different mechanisms, including earlier non-exclusive load operations processed before a load exclusive instruction. In such situations, the data will already be in the cache when the load exclusive instruction is executed, and accordingly there will be no need at that time to issue a read request to the coherent interconnect. As another example mechanism by which the data may be brought into the cache, modern processing units often use prefetching mechanisms to seek to prefetch into the cache data ahead of that data being required by the processing unit, and if the data is brought into the cache as part of a prefetching operation, it is not at that time being retrieved into the cache as part of an exclusive sequence, and accordingly the coherent interconnect will not be notified at that time that the read request being made (in order to process the prefetch) is part of an exclusive sequence.

When using the snoop unit in the manner discussed earlier in order to determine whether an ownership upgrade request issued by the first processing unit should pass or fail, then in a situation where it is determined that the request should fail, the first processing unit is notified of that fail condition, and in addition the global monitor circuitry may be arranged to set an entry within the global monitor to identify the first processing unit and the target memory address. Such a mechanism can prevent occurrence of livelock situations.

The processing units within the system can take a variety of forms. For example, one or more of the processing units may be provided by separate processor cores. Alternatively, or in addition, one or more of the processing units may be provided by separate threads on a multi-threaded processor core.

Particular examples will now be described with reference to the Figures.

FIG. 1 is a block diagram of a system in accordance with one example implementation. A plurality of processing units 10, 15, 20, 25 are coupled to a coherent interconnect 35 via which they can access a plurality of slave devices (not explicitly shown in the figure), where one of those slave devices may be a memory controller for controlling access to memory 40. Each of the processing units 10, 15, 20, 25 has associated cache 12, 17, 30 for storing cached versions of data from the memory 40. Whilst in FIG. 1 each of the processing units is assumed to have associated local cache structures, this is not essential, and one or more of the processing units may not have a local cache structure. However, for the purposes of the following discussion, the processing units of interest are the ones that have access to a local cache structure.

Whilst the various processing units connected to the interconnect 35 may be individual processing units, such as a central processing unit (CPU) or a graphics processing unit (GPU), it is possible that one or more of the processing units may effectively form a subsystem/cluster, consisting of multiple individual processing units which may for example have access to a shared cache structure, as illustrated by way of example with reference to the subsystem 32 comprising the processing units 20, 25 that share a local cache structure 30. In one specific example the subsystem takes the form of a multi-threaded processor core, and the individual processing units 20, 25 therein are separate threads.

Whenever the system includes processing units that have an associated local cache structure, it will typically be necessary for the interconnect to implement a cache coherency protocol to ensure that the various processing units coupled to the interconnect will always see the most up-to-date version of any particular data item. To assist in implementing the cache coherency protocol, the coherent interconnect 35 includes a snoop unit 45 which aims to keep track, for each of a number of different memory portions, of which processing units have accessed addresses within those memory portions, thus identifying which processing units may hold cached copies of data relating to those memory portions. When it is determined that a coherency action is required, the snoop unit 45 is used to determine which caches associated with the processing units should be subjected to a snoop operation in order to determine information about the data cached within those caches for a particular memory address.

In particular, a snoop request can be issued from the snoop unit to such a cache specifying a snoop address, causing a lookup to be performed within the cache, and information returned to the snoop unit indicative of the result of that lookup. There will typically be local coherency control circuitry in association with each of the caches that can take an appropriate action in response to the snoop request. In particular, if a hit is detected, then dependent on the cache coherency protocol being used and the type of snoop request, it may be appropriate for the local cache to invalidate the cache line containing a copy of the data and to return its copy of the data to the snoop unit as part of a snoop response. Alternatively, it may return the data to the snoop unit without invalidating its copy. Further, in other examples, it may merely need to invalidate the cache line containing a copy of the data, without needing to return its copy of the data to the snoop unit.

When an access request is issued by one of the processing units seeking to access data at a memory address specified by the access request, and a hit is not detected in any local cache structure of that processing unit, then that access request may be propagated on to the snoop unit 45. It should be noted that that access request may still be propagated on to the snoop unit even if there is a hit in a local cache, depending on the type of access that the processing unit is seeking to perform. For example, if the originating processing unit (i.e. the processing unit issuing the access request) is seeking to perform a write access, and a hit is detected in its local cache, it may be appropriate to determine whether any of the other processing units also have a local cached copy, by reference to the snoop unit 45, since those copies will become out of data once the write access has been performed to the originating processing unit's local cache, and hence it may be considered appropriate to invalidate any other processing unit's local copies at the time the write access is being performed to the originating processing unit's local cache.

Whenever an access request is received by the snoop unit 45, then snoop control circuitry 55 within the snoop unit 45 is used to determine whether any snoop operations are required, and if so to issue snoop requests to the relevant processing units to cause snoop operations to be performed, during which their local cache structures will be accessed as discussed earlier and any appropriate coherency action taken, resulting in the provision of a snoop response back to the snoop unit.

Rather than merely broadcasting a snoop request to every processing unit that has an associated local cache structure, the snoop unit 45 has snoop filter storage 60 that provides a plurality of snoop filter entries, where each snoop filter entry is arranged to identify a memory portion, and to maintain snoop control information indicative of the processing units that have accessed that memory portion. The memory portion identified in each snoop filter entry can take a variety of forms. For example, the memory portion may correspond to a unique address in memory, or can specify an address range. In one particular example, each memory portion corresponds to a range of memory addresses of a size that matches the size of a cache line within one of the caches.

When an access request is received at the snoop unit 45, the snoop control circuitry 55 can perform a lookup operation within the snoop filter storage 60 using the memory address specified by the access request in order to determine whether there is a hit in any of the snoop filter entries, i.e. whether the memory address is an address within the memory portion associated with a particular snoop filter entry. If so, then the snoop control information can be retrieved from that snoop filter entry in order to determine which of the processing units are to be subjected to a snoop operation. The various entries in the snoop filter storage are updated as each access request is performed by the processing units, so as to seek to maintain information about the processing units that have accessed particular memory portions being tracked within the snoop filter storage. By such an approach, this can significantly reduce the number of snoop operations that need to be performed, relative to an approach which merely speculatively broadcasts snoop requests to all of the processing units.

FIG. 1 also includes contention mitigation circuitry used to control contended access to a memory address by two or more of the processing units. In the example illustrated in FIG. 1, the contention management circuitry comprises a global monitor 50 within the coherent interconnect 35 and local monitors 14, 19, 22, 27 associated with each processing unit 10, 15, 20, 25. These components of the contention management circuitry operate to seek to manage situations of contended access to a memory address, and in particular to implement measures to seek to ensure that a livelock scenario does not arise in such situations.

Figure 2:
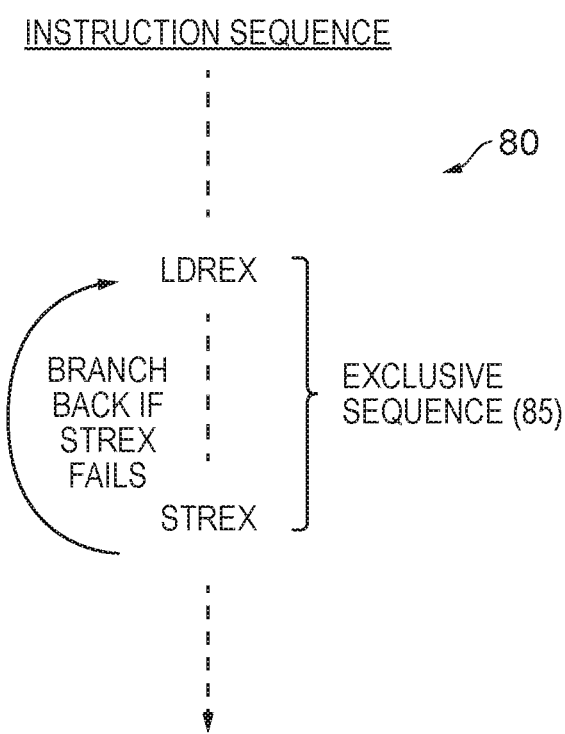
FIG. 2 illustrates how an exclusive sequence may be provided within an instruction stream.

The individual processing units will typically execute a stream of instructions, and those streams may include an exclusive sequence of instructions, an example of such an exclusive sequence being shown in FIG. 2. In particular, FIG. 2 shows an instruction sequence 80 that includes an exclusive sequence 85 comprising both a load exclusive (LDREX) instruction and a store exclusive (SDREX) instruction (these being a particular example of the LL/SC pair of instructions discussed earlier), both the load exclusive and the store exclusive instructions referring to the same target memory address. There may be one or more intervening instructions between the load exclusive and the store exclusive instruction forming the exclusive sequence 85, for example to perform one or more operations using the loaded data.

Such a load exclusive instruction is executed in order to read the value of data at a memory location, requesting exclusive access to that memory location. The store exclusive instruction can then be viewed as a conditional store instruction, that is executed in order to attempt to write an updated value to the same memory location. However, the store exclusive instruction will only be executed if the process including the exclusive sequence was able to gain exclusive access to the memory location in question, and if that is not the case the exclusive sequence fails, and will need to be retried. The processing of exclusive sequences by multiple processing units is one example scenario that can give rise to contended access to a memory location. In particular, if between the time a first process executes the load exclusive instruction, and the time it executes the store exclusive instruction, another process has obtained access to the memory location, then the originating process will no longer have exclusive access at the time the store exclusive operation is attempted, and the exclusive sequence will fail.

When the target memory address for the exclusive sequence is a cacheable location in memory, then execution of the original load instruction will typically cause a copy of the data to be loaded into the relevant processing unit's local cache. In accordance with the cache coherency protocol employed within the system, a state is typically associated with each cache line, in particular to identify whether the cache line holds a unique copy of the data (referred to as the unique state), or whether instead one or more other caches associated with different processing units also have a copy (referred to as the shared state). If at the time a processing unit attempts to perform a store exclusive operation, that processing unit's cache has a copy that is shared, then that processing unit will issue an ownership upgrade request to the coherent interconnect 35 to seek to obtain the data in the unique state. Assuming it is concluded that there is no contention for access to the memory location, which would prohibit successful completion of the exclusive sequence, then the snoop unit can be referred to in order to issue invalidating snoop requests to the caches of any other processing units that maintain a copy, so as to allow the cache of the processing unit issuing the ownership upgrade request to gain a unique copy of the data. It will be appreciated that at this point the data does not typically need to be updated, and all that is required is for the coherent interconnect to advise the requesting processing unit that it can indeed update the state of its cache line content to unique rather than shared, whereafter the store exclusive operation can be performed locally in respect of the local cached data.

Typically the contention mitigation circuitry is referred to on receipt of the ownership upgrade request to determine whether there is any contended access to the data, and if there is the above described snoop operations do not need to be performed, and instead the processing unit is merely advised that the request has failed. Typically, the contention management circuitry will then update its internal state so that when the processing unit retries the exclusive sequence, resulting in the issuance of a subsequent ownership upgrade request, that ownership upgrade request will then pass on that attempt provided no contended access occurs in the interim.

However, the inventors of the present technique observed that a significant number of false fails were being issued by the contention management circuitry. In particular, when performing test workloads on the various processing units which were of a type where it was very unlikely that actual contention for access to any particular memory location would occur, it was found that many of the exclusive sequences were still failing on their first attempt. Whilst they would ultimately succeed on the next attempt, and hence correct operation was still observed, the failing on the first attempt gave rise to a significant increase in transactions through the coherent interconnect.

In accordance with the techniques described herein, an alternative approach has been adopted, whereby the decision as to whether to pass or fail an ownership upgrade request can be made directly with reference to the snoop filter storage contents within the snoop unit 45, independent of the information maintained by the contention management circuitry.

Figure 3A:
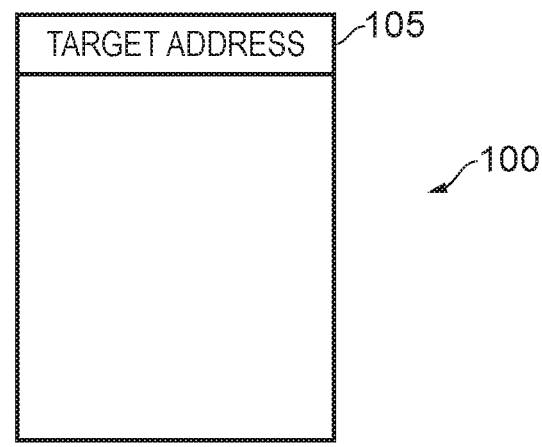
FIGS. 3A and 3B illustrate information maintained by the local monitors and global monitor of FIG. 1, in accordance with one example arrangement.
Figure 3B:
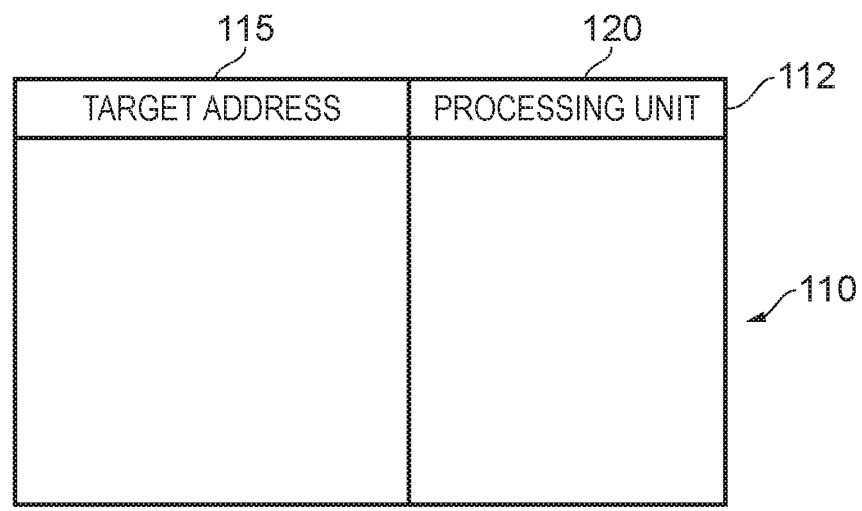

FIGS. 3A and 3B illustrate information that may be maintained within the local monitors 14, 19, 22, 27 and the global monitor 50, in accordance with one example arrangement. In particular, the local monitors 100 may comprise multiple entries 105, where each entry can be used to store a target address. When a load exclusive instruction is executed by a processing unit, then the target address for that load exclusive instruction is identified (set) within an entry 105 of the local monitor 100 at that processing unit. Then, when an associated store exclusive instruction is successfully executed, that entry is cleared. However, the entry can also be cleared for other reasons in the interim. For example, if the snoop unit issues an invalidating snoop request to the processing unit identifying that target address, then the entry in the local monitor will be cleared.

The global monitor 110 also tracks target addresses, but each entry 112 has two fields, a first field 115 to identify a target address, and a second field 120 to identify a particular processing unit. When a read request is received by the coherent interconnect, and that read request is identified as being due to an exclusive sequence being executed by the requesting processing unit, then an entry within the global monitor is set in order to identify the target address of the read request, and the processing unit making that request. If other processing units also make read requests marked as being related to exclusive sequences to the same target address, then separate entries will also be made for those other processing units, and hence it will be appreciated that at any point in time the global monitor may have multiple entries associated with a particular target address, but each entry identifying a different processing unit.

When an ownership upgrade request (also referred to herein as a clean unique exclusive request) is considered to pass, as opposed to fail, hence allowing the requesting processing device to successfully perform the store exclusive operation to complete the exclusive sequence, then any global monitor entries for the target address associated with any of the other processing units are cleared. In one implementation, the entry for the requesting processing unit within the global monitor could also be cleared at this point, but that is not required. Conversely, if the clean unique exclusive request for a particular processing unit fails, then an entry is set in the global monitor for the target address in question and for the requesting processing unit. In particular, it is known that the exclusive operation will fail, and will be retried, and accordingly this primes the global monitor so that on the next attempt the request will pass, provided there is no contended access in the interim.

Figure 4:
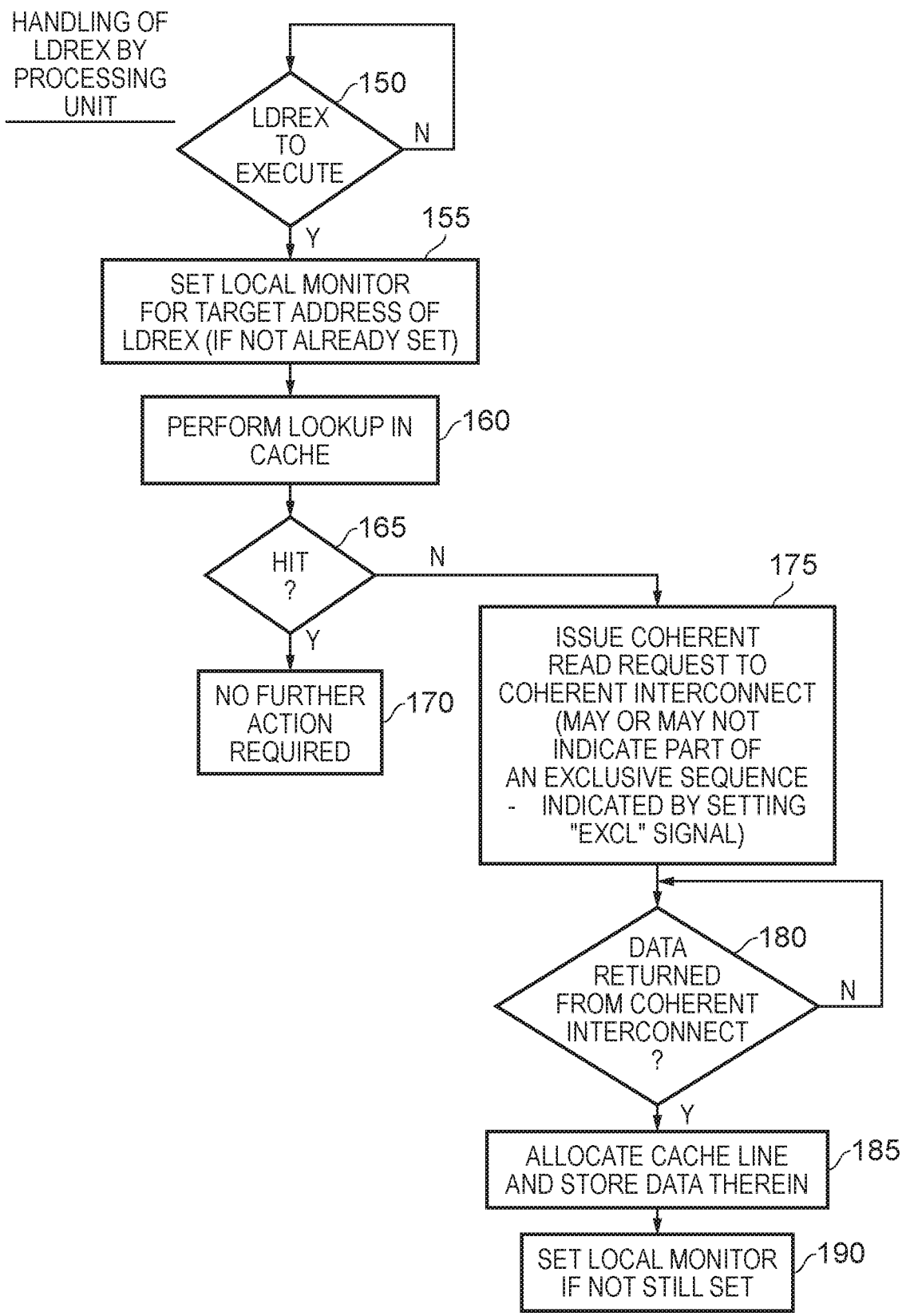
FIG. 4 is a flow diagram illustrating the steps performed by a processing unit when executing a load exclusive instruction, in accordance with one example arrangement.

FIG. 4 is a flow diagram illustrating the operations performed by a processing unit when it executes a load exclusive instruction. If at step 150 it is determined that there is a load exclusive instruction to be executed, then at step 155 the local monitor is set for the target address of the load exclusive instruction, if the local monitor is not already set for that target address. As discussed earlier, the setting of the local monitor involves populating an entry within the local monitor with the target address.

Thereafter, at step 160 a lookup operation is performed within the local cache, and then at step 165 it is determined whether a hit has been detected by that lookup operation, i.e. whether it has been detected that the cache already stores the data for the target address. If so, the process proceeds to step 170 where no further action is required.

However, if a hit is not detected at step 165, then the process proceeds to step 175 where a coherent read request is issued to the coherent interconnect 35. The coherent read request can take a variety of forms, but it is noted that that coherent request may not necessarily indicate that it is being issued as part of an exclusive sequence. In particular, an EXCL signal may be provided that can be asserted to identify that the associated read request is due to an exclusive sequence, but the read request may not assert that signal. It is perfectly legitimate for the read request not to exert the EXCL signal at this point, since whether it does or does not do so does not ultimately affect correct operation. It is also noted that the read request that brings the data into the local cache may not actually be a read request associated with the exclusive sequence, but could for example be an earlier read request that was a non-exclusive read request to that target address. In such a scenario, the data will have been loaded into the cache without being flagged as being part of an exclusive sequence, and when the lookup is performed at step 160 a hit will be detected and no further action will be taken.

As another example, a read request used to bring the data into the cache may be due to a prefetch operation being performed by the processing unit. In particular, in modern systems, prefetch circuitry is often provided in order to seek to detect patterns of accesses by the processing unit, and seek to prefetch data into its local cache before that data is actually required by a demand access of the processing unit. This can significantly increase performance. However, again, it will be appreciated that when the data associated with an exclusive sequence has been prefetched, then at the time of the prefetching the associated coherent read request would not mark the read request as being due to an exclusive sequence, and when the load exclusive instruction was subsequently executed as part of the exclusive sequence, a hit would be detected in the cache, and no further read request will hence be issued to the coherent interconnect.

When a coherent read request is issued at step 175, then at step 180 the processing unit awaits the return of the data from the coherent interconnect, whereafter the data is allocated into a cache line of the processing unit's local cache, and hence the data is stored in that allocated cache line at step 185. At step 190, the local monitor is set if it is determined that it is not still set by virtue of the earlier step 155.

Figure 5:
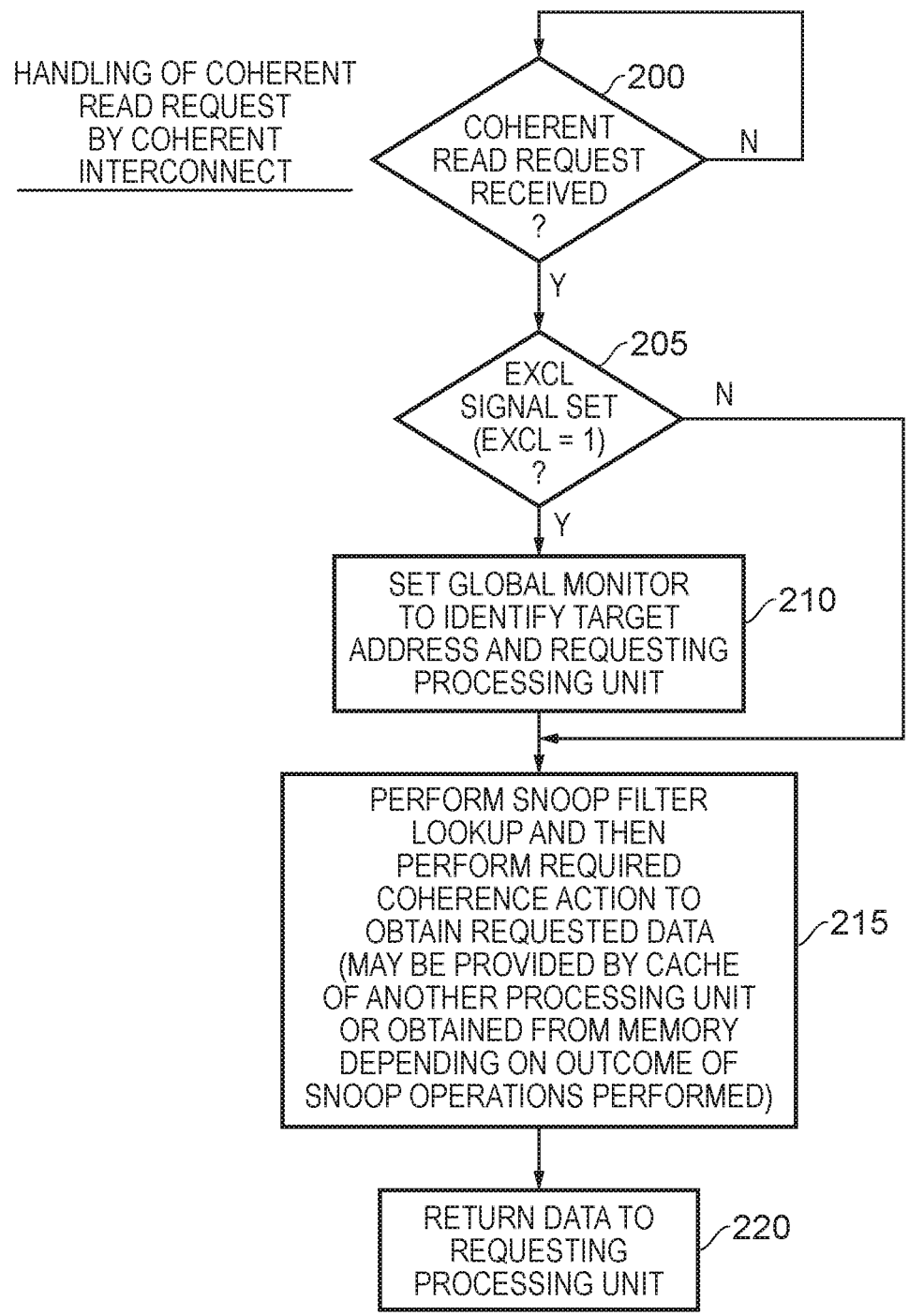
FIG. 5 is a flow diagram illustrating the steps performed by the coherent interconnect upon receiving a coherent read request from a processing unit, in accordance with one example arrangement.

FIG. 5 is a flow diagram illustrating the steps performed by the coherent interconnect 35 in order to process a coherent read request received from one of the processing units. As mentioned earlier, a coherent read request could be issued for a variety of reasons, and hence could be due to a prefetch operation, a non-exclusive read operation, or due to execution of a load exclusive instruction. Whatever the reason for the coherent read request being issued, when such a coherent read request is detected at step 200, it is determined at step 205 whether the EXCL signal is set, in one embodiment the set state being a logic one state. As mentioned earlier, there is no requirement for read requests resulting from execution of the load exclusive instruction to set the EXCL signal, and in addition the EXCL signal will not be set if the coherent read request relates to other activities, such as a non-exclusive read, or prefetching activity.

If the EXCL signal is set, then at step 210 the global monitor is set to identify the target address and the requesting processing unit, by populating an entry within the global monitor with that information. However, otherwise, step 210 is bypassed.

At step 215, a snoop filter lookup is performed within the snoop filter storage 60 of the snoop unit 45 in order to detect whether there is currently a snoop filter entry for a memory region including the target address of the coherent read request. If so, then this indicates that one or more of the caches within the system may hold a copy of the data, and the snoop control information in that hit snoop filter entry can be used to identify which processing units to subject to a snoop operation in order to determine whether they do in fact have a copy of the data, and to cause a suitable coherence action to be taken. In one example implementation, any snoop operations performed at step 215 are non-invalidating snoop operations, and accordingly if a processing unit subjected to such a snoop operation does have a local copy of the data in its cache, it can retain that local copy, and return the copy to the coherent interconnect as part of the snoop response, so that that copy can be provided to the processing unit that issued the coherent read request. At that point, both the copy in the original cache and the copy that is now stored in the cache of the requesting processing unit will have their states set to shared to identify that there are multiple copies of the data cached within the system.

If there is no active snoop entry covering the target address, or any snoop operations performed do not identify a cached copy of the data, then the data can be obtained from memory and returned to the processing unit. At that point, a snoop entry will typically be allocated to identify which processing units have a copy of the data (in particular identifying that the processing unit that issued the coherent read request now has a copy).

As indicated at step 220, when the data is obtained through performance of step 215, that data is then returned to the requesting processing unit so that it can be stored in that requesting processing unit's local cache.

Figure 6A:
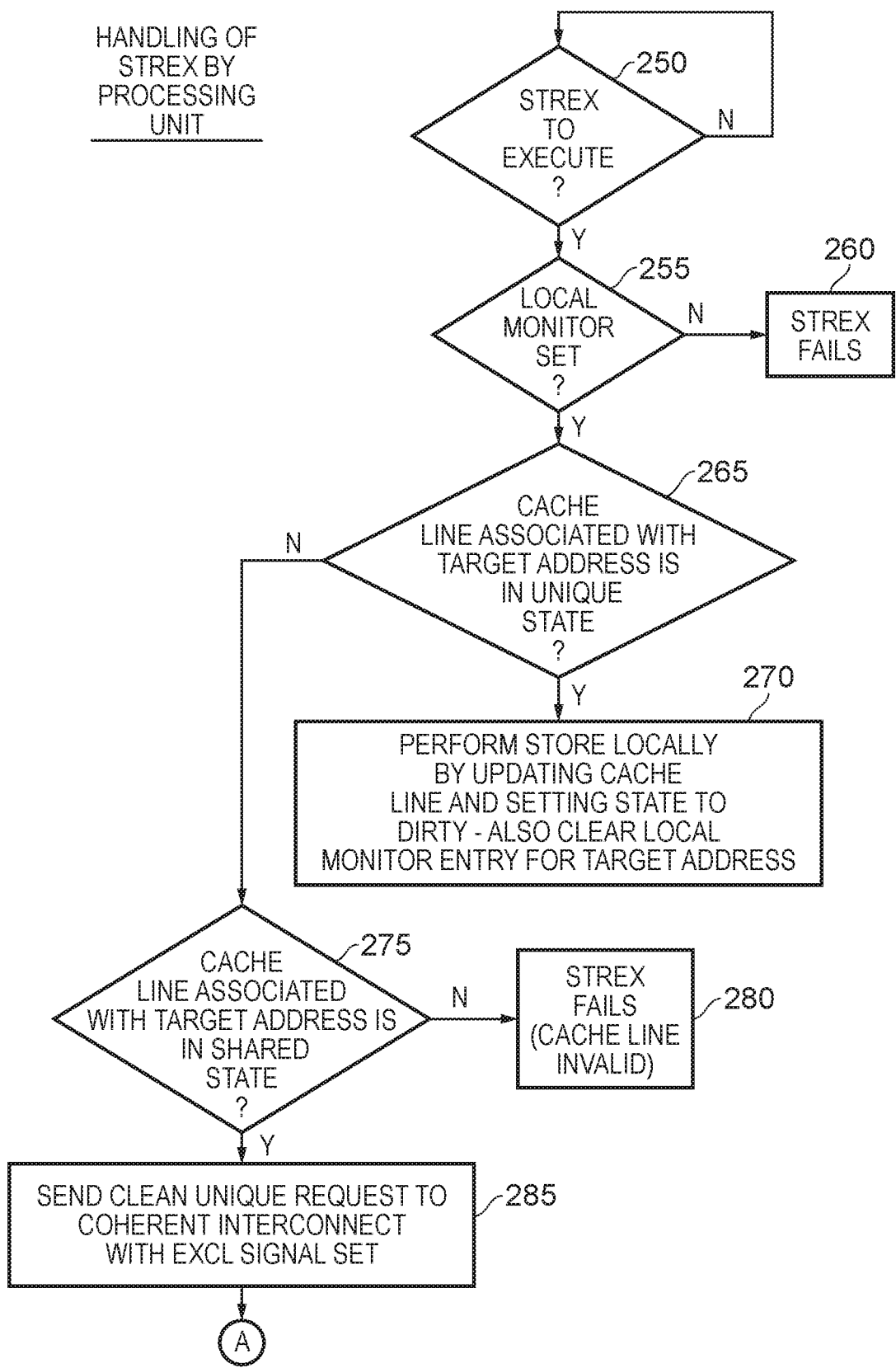
FIGS. 6A and 6B provide a flow diagram illustrating the steps performed by a processing unit on executing a store exclusive instruction, in accordance with one example arrangement.
Figure 6B:
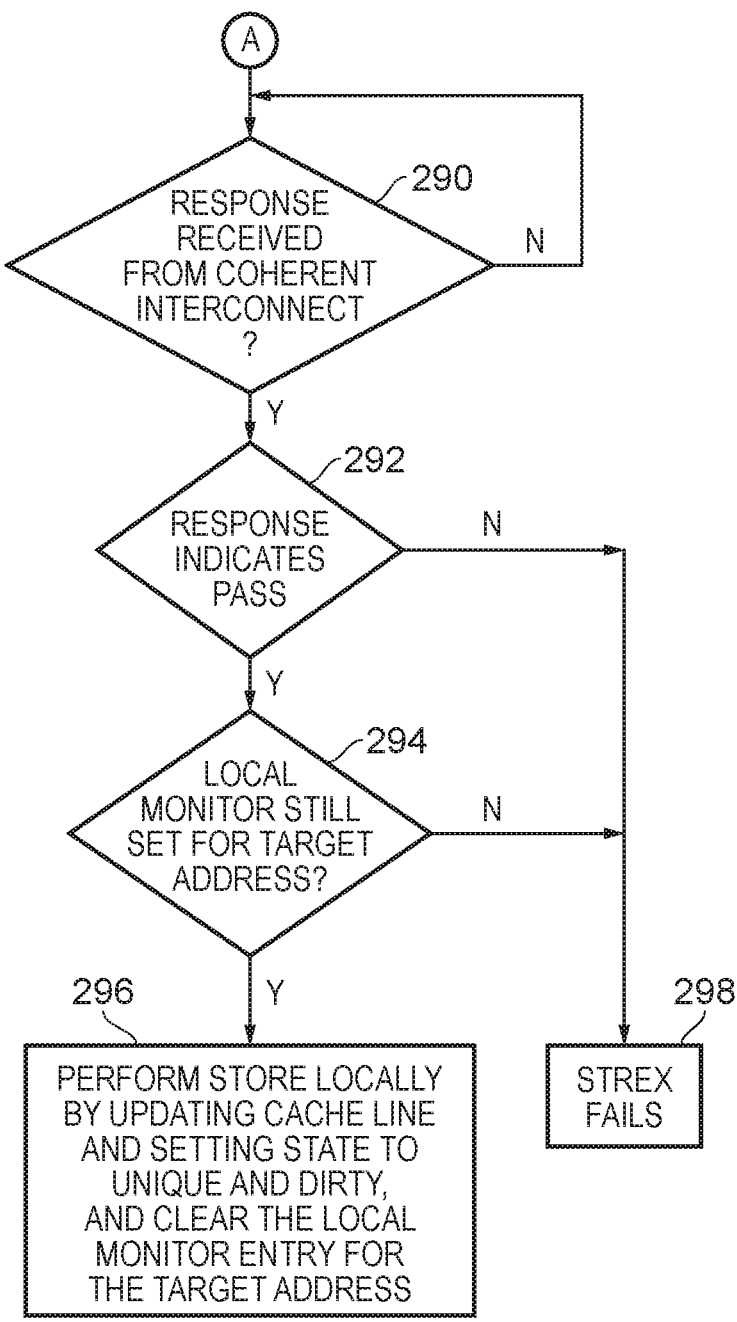

FIGS. 6A and 6B provide a flow diagram illustrating how a processing unit processes a store exclusive instruction. At step 250, it is determined that there is a store exclusive instruction to be executed, and then at step 255 it is determined whether the local monitor is set for the target address of the store exclusive instruction. If not, then the process proceeds to step 260 where the store exclusive instruction fails, i.e. is not executed. At this point, the exclusive sequence fails, and will need to be repeated. In particular, if the local monitor is not set for the target address, this means that the processing unit's local cache will no longer have a copy, and accordingly there must have been a contended access attempt to the data by another processing unit since the associated load exclusive instruction was executed, and accordingly it is appropriate for the exclusive sequence to fail.

If the local monitor is determined to be set at step 255, then it is determined at step 265 whether the cache line associated with the target address within the processing unit's local cache is in the unique state. If so, then this means that the store exclusive operation can proceed, and accordingly at step 270 the store operation is performed locally by updating the contents of the cache line, and then setting the state of that cache line to dirty if the address relates to a write back region of memory. At this point, the local monitor entry for the target address is cleared. This ensures that store exclusive instructions are always paired with earlier load exclusive instructions, and hence prevents a second store exclusive instruction from proceeding, if there was no associated load exclusive instruction.

If at step 265 it is determined that the cache line is not currently in the unique state, then at step 275 it is determined whether the cache line is in the shared state. If not, then it assumed that the cache line is invalid at step 280, and the store exclusive operation fails, requiring the exclusive sequence to be retried.

However, if at step 275 the relevant cache line is determined to be in the shared state, then at step 285 a clean unique request is sent to the coherent interconnect with the EXCL signal set. Such a clean unique request will be referred to as a clean unique exclusive request, and is also referred to herein as an ownership upgrade request.

At step 290, the processing unit then awaits a response from the coherent interconnect. When the response is received, it is determined at step 292 whether the response indicates a pass condition for the clean unique exclusive request, if not, then the process proceeds to step 298 where the store exclusive operation fails, and again the exclusive sequence will then need to be retried.

However, if the response indicates a pass, then it is determined at step 294 whether the local monitor is still set for the target address. If not, then again the store exclusive operation fails. For instance, if an intervening snoop operation has invalidated the cache line, causing the local monitor to be cleared, this would indicate the presence of a contended access, and accordingly it would be appropriate for the store exclusive operation to fail.

However, if the local monitor is also determined to still be set at step 294, then the process proceeds to step 296 where the store operation is performed locally by updating the cache line and setting the state to unique and dirty. As with the earlier step 270, at this point the local monitor entry for the target address is cleared.

Figure 7:
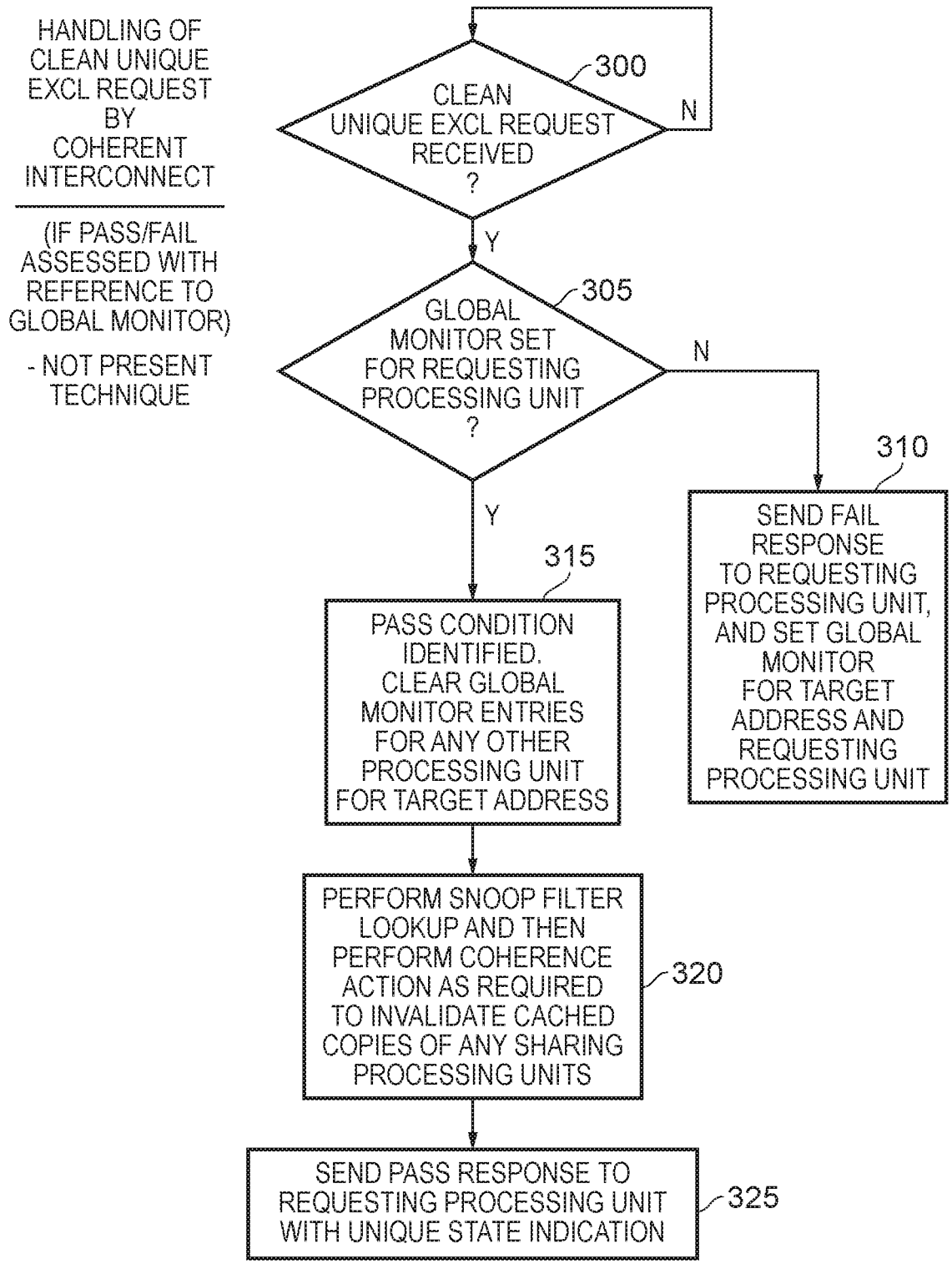
FIG. 7 is a flow diagram illustrating steps that might typically be taken by a coherent interconnect in order to handle a clean unique exclusive request, when not employing the technique described herein.

FIG. 7 is a flow diagram illustrating how the coherent interconnect would have handled the clean unique exclusive request prior to the use of the technique described herein, and in particular where the state of the contention management circuitry was used to determine whether to pass or fail the clean unique exclusive request. If at step 300 a clean unique exclusive request is received, then it is determined at step 305 whether the global monitor is set for the target address and the requesting processing unit. If not, the process proceeds to step 310 where a fail response is sent to the requesting processing unit, requiring the processing unit to retry the exclusive sequence. In addition, the global monitor is then set for the target address and the requesting processing unit, so as to prime the global monitor to enable the subsequent retry to pass when the clean unique exclusive request is issued, assuming no intervening conflicting access has been made.

If at step 305 it is determined that the global monitor is set, then at step 315 the pass condition is identified. The global monitor entries for any other processing units for that target address are then cleared, since at that point those other processing units should fail when they attempt performance of their exclusive sequence with respect to that target address. Optionally, the global monitor entry for the requesting processing unit that has now passed the condition could also be cleared, but that is not a requirement.

At step 320, a snoop filter lookup is performed within the snoop filter storage 60 of the snoop unit 45 and then a coherence action is performed as required by that lookup in order to invalidate any cached copies of the data at the target address maintained by any sharing processing units other than the requesting processing unit. Then, at step 325 a pass response is sent to the requesting processing unit along with the unique state indication, thereby enabling the processing unit to successfully complete execution of the store exclusive instruction. As will be apparent from the later discussed FIG. 10, the use of the approach of FIG. 7 can have a significant performance impact, due to occurrence of false fail conditions.

Figure 8:
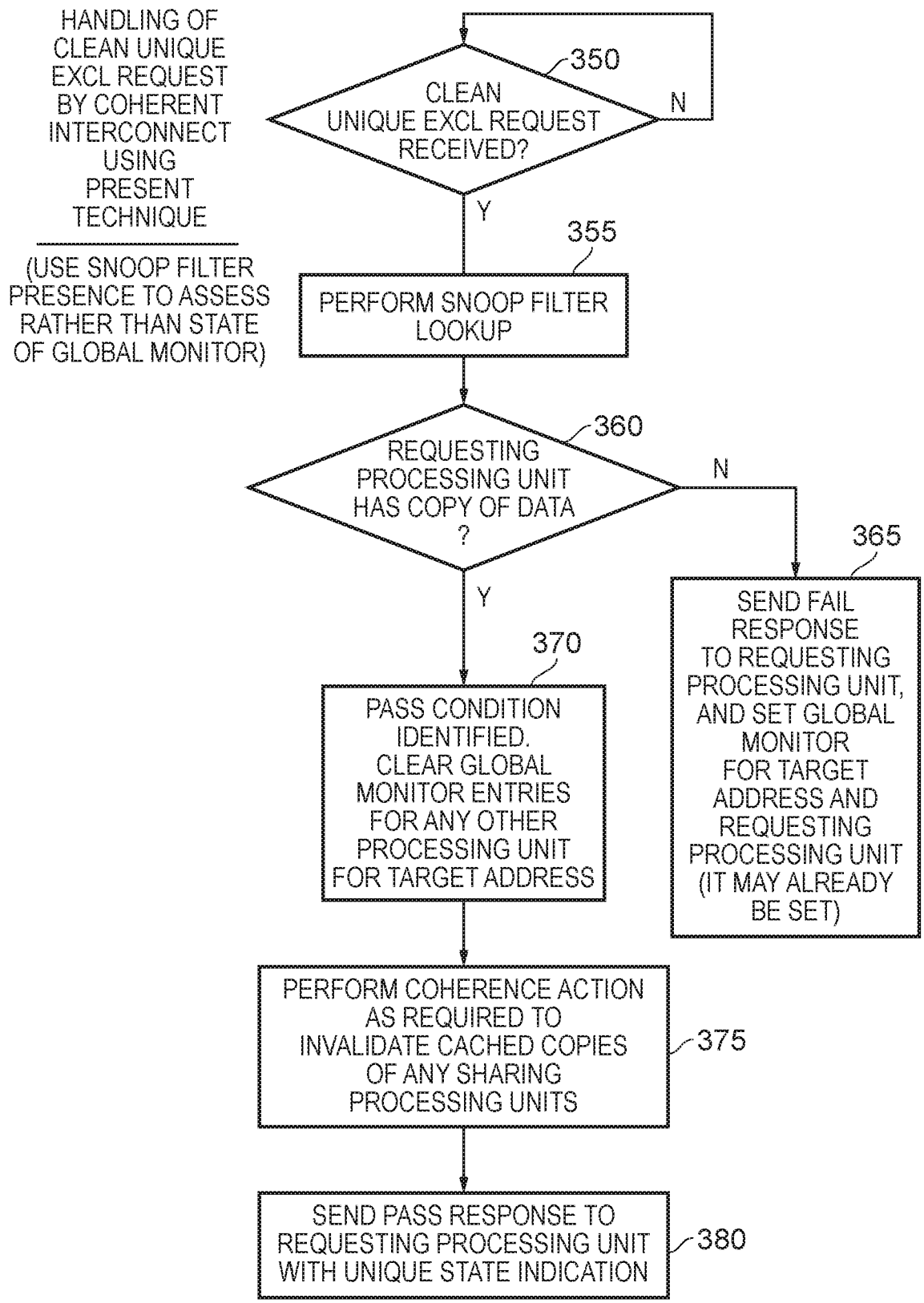
FIG. 8 is a flow diagram illustrating the steps taken by the coherent interconnect in order to handle a clean unique exclusive request, in accordance with the techniques described herein.

However, FIG. 8 is a flow diagram illustrating how the coherent interconnect processes a clean unique exclusive request when adopting the techniques described herein, enabling such false fails to be avoided. At step 350, when a clean unique exclusive request is received, then at step 355 a snoop filter lookup is performed to determine whether there is a snoop filter entry for a memory region including the target address. If the exclusive sequence is to succeed, this should be the case, since at least the requesting processing unit should still have a copy of the data.

At step 360, it is determined whether the requesting processing unit does indeed still have a copy of the data. In one particular embodiment, the snoop control information precisely identifies each individual processing unit that has accessed the data for a cache line, and hence will directly identify whether the requesting processing unit has a copy of the data. However, if the snoop unit instead maintains imprecise information, where for example presence bits within a snoop filter entry are associated with particular groups of processing units, then following the snoop filter lookup, a snoop query can be sent to the requesting processing unit if that requesting processing unit is within a group that is indicated as potentially having a copy of the data, processing of that snoop query enabling a determination to be made as to whether the requesting processing unit does indeed still have a copy.

If the requesting processing unit does not still have a copy of the data, then this indicates the presence of a contended access, since in the absence of a contended access the copy obtained through execution of the earlier load exclusive instruction should still be present. Hence, if the requesting processing unit no longer has a copy of the data, the process proceeds to step 365 where the fail response is sent to the requesting processing unit. At this point, the global monitor is set for the target address and the requesting processing unit. It should be noted that since the contents of the global monitor are not referred to when making the pass/fail decision, it may be the case that the global monitor is already set for the target address and the requesting processing unit.

If at step 360 it is determined that the requesting processing unit still has a copy of the data, then it is determined that the pass condition has been identified, since it will then be known that there has not been any contended access to the cache line containing the data (if there had been a contended access, then a snoop invalidate request would have been sent to the requesting processing unit to invalidate its copy of the data). At step 370, in addition to identifying that the pass condition is present, the global monitor entries for any other processing unit for that target address are cleared. At step 375, a coherence action is then performed as required by the result of the snoop filter lookup performed earlier at step 355, in order to invalidate any cached copies of the data maintained by any sharing processing units. At step 380, the pass response is then sent to the requesting processing unit with the unique state indication, as per step 325 of FIG. 7.

Figure 9:
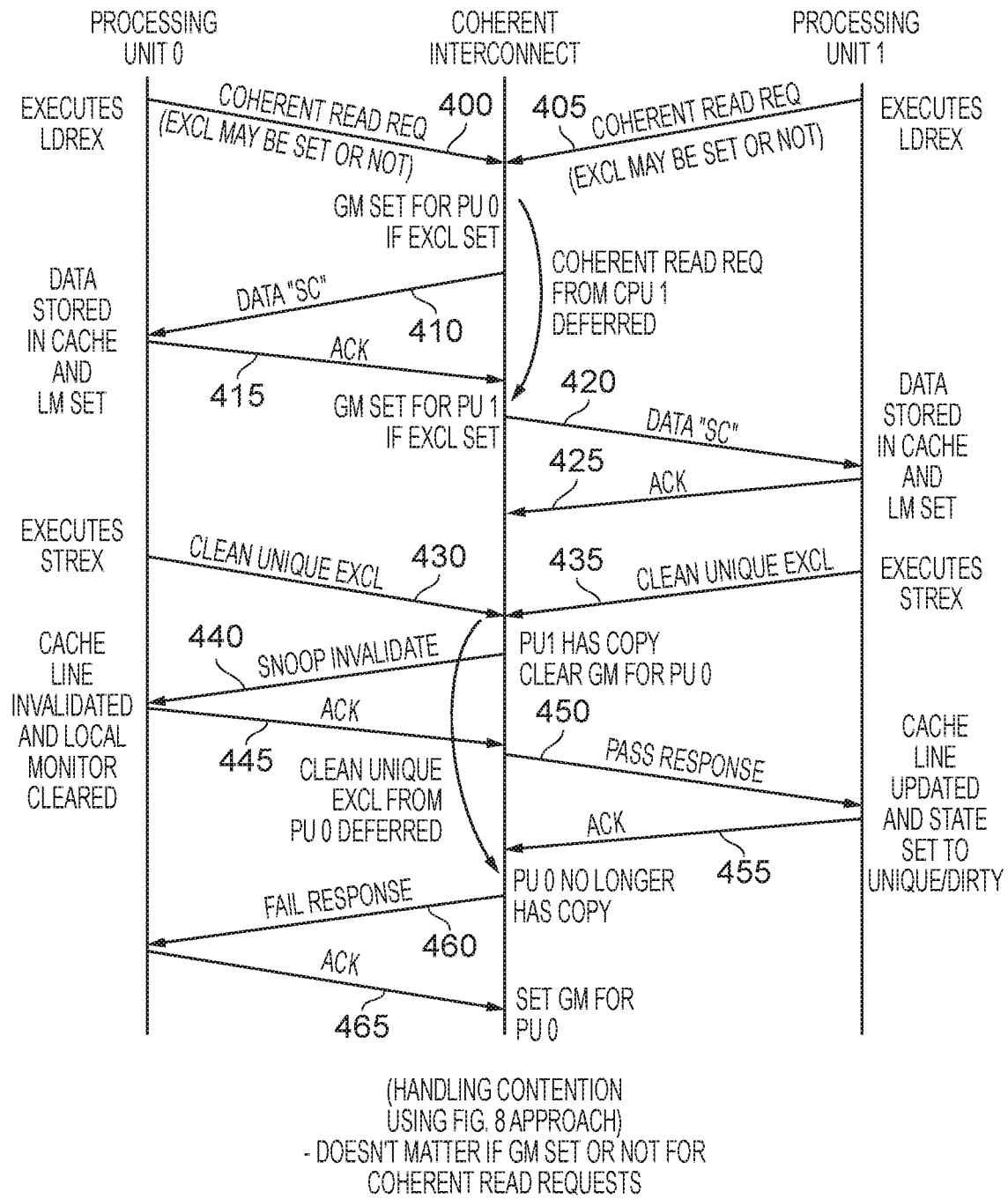
FIG. 9 shows an example sequence of transactions between processing units and the coherent interconnect, to illustrate the handling of contention when using the approach of FIG. 8 to handle the clean unique exclusive request.

FIG. 9 illustrates transactions performed between a pair of processing units in the coherent interconnect in a contended access situation, but where the approach of FIG. 8 is used. In particular, it is assumed that both processing unit 0 and processing unit 1 are attempting to perform the same exclusive sequence, and hence are both executing pairs of load exclusive and store exclusive instructions specifying the same target address. It is also assumed that neither processing unit initially has a copy of the data at the target address in its local caches, but that that data is stored by another processing unit's local cache. Accordingly, as will be apparent from the earlier discussed FIG. 4, during the processing of the load exclusive instruction by both processing units, a coherent read request will be issued to the coherent interconnect. In particular the coherent read request 400 is issued from the processing unit 0, and similarly the coherent read request 405 is issued from the processing unit 1.

It is assumed in the illustrated example that the coherent read request 400 is processed first by the coherent interconnect. The global monitor will be set for processing unit 0 if the EXCL signal is set in association with the coherent read request 400. However, as discussed earlier, it may or may not be, and accordingly it cannot be guaranteed that the global monitor will be set at this point. A snoop operation (not shown) is then performed in order to obtain a copy of the data from the processing unit that holds a local copy, and that data is returned to processing unit 0 as a shared copy (SC) via transfer 410. The data is then stored in the processing unit's local cache, and the local monitor is set. An acknowledgement signal 415 is then returned to the coherent interconnect.

Thereafter, the coherent interconnect begins handling of the coherent read request 405 from processing unit 1. Again, the global monitor will be set for processing unit 1 if the EXCL signal is set, and then a copy of the shared data is obtained via a snoop operation and returned to the processing unit 1, as indicated by the transfer 420. The data will then be stored in the local cache of processing unit 1, and the local monitor will be set. Again, an acknowledgement signal 425 is then returned to the coherent interconnect.

At this point, it will be appreciated that both processing units have a local shared copy in their cache, and both local monitors are set. It is then assumed that both processing units begin execution of the store exclusive instruction. As will be apparent from the earlier discussed FIG. 6A, this will result in clean unique exclusive requests 430, 435 being issued by both processing units to the coherent interconnect. This time, it is assumed that it is the request from processing unit 1 that is handled first. When performing the process of FIG. 8, the coherent interconnect will determine, via the snoop filter lookup, that processing unit 1 has a copy, and accordingly the pass condition will be identified. The global monitor will then be cleared for processing unit 0 at step 370 of FIG. 8, and then at step 375 of FIG. 8 a snoop invalidate request will be sent to any processing units having a shared copy, including the snoop invalidate request 440 sent to processing unit 0. This will cause processing unit 0 to invalidate its cache line, and clear its local monitor, and in addition processing unit 0 will then send an ack 445 back to the coherent interconnect. Then, at step 380 of FIG. 8, the coherent interconnect can send the pass response 450 to processing unit 1, allowing processing unit 1 to successfully complete execution of its store exclusive instruction, during which the cache line will be updated and its state set to unique and dirty. An acknowledgment will then be sent over path 455 to the coherent interconnect.

Thereafter, the coherent interconnect can begin processing of the clean unique exclusive request 430 from processing unit 0. However, this time, when performing the process of FIG. 8, it will be determined that processing unit 0 no longer has a copy, and accordingly the process will proceed directly to step 365 of FIG. 8, where a fail response 460 will be issued to processing unit 0, resulting in the acknowledgement 465. During this process, the global monitor will be set for processing unit 0 as per step 365 of FIG. 8.

Accordingly, it can be seen that contended access is managed correctly when adopting the approach discussed earlier with reference to FIG. 8, and it does not matter if the global monitor is set or not for the coherent read requests since irrespective of whether the global monitor is set or not, this will not result in any delay to the processing of the exclusive sequence for the processing unit that wins the contention.

Figure 10:
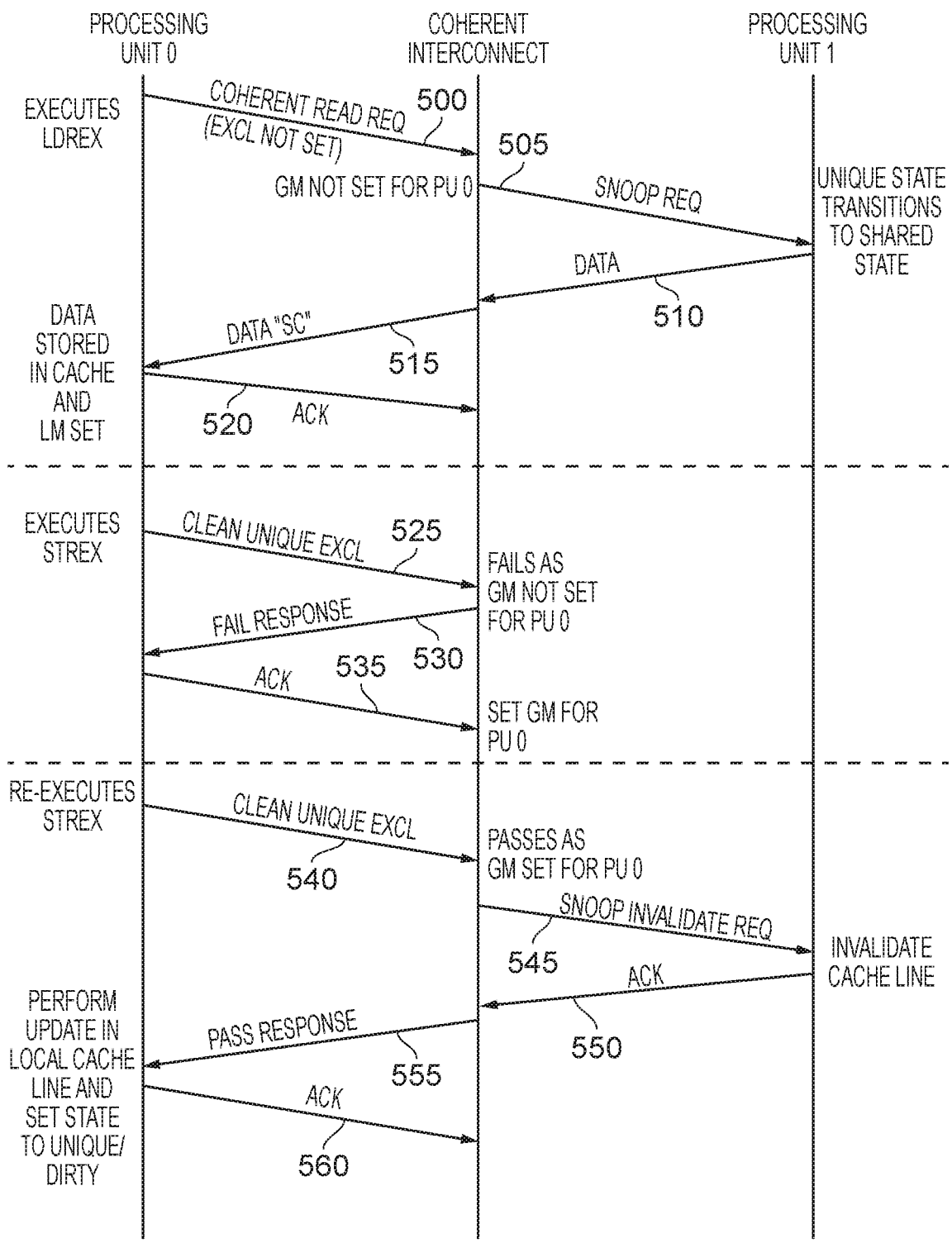
FIG. 10 illustrates a sequence of transactions between a processing unit and the coherent interconnect in the absence of contention, when using the approach of FIG. 7 to handle the clean unique exclusive request.

FIG. 10 is a diagram illustrating transactions performed between processing unit 0 and a coherent interconnect in the absence of a contended access, but when adopting the approach of FIG. 7. It is assumed that when the load exclusive instruction is executed by processing unit 0, a hit is not detected in the cache, and accordingly a coherent read request 500 is issued to the coherent interconnect. The EXCL signal is not set in this example scenario, and accordingly the global monitor is not set for processing unit 0. In this example it is assumed that processing unit 1 initially has a unique copy of the data, and accordingly when the snoop operation is performed, a snoop request 505 will be issued to the processing unit 1, causing the return of the data via transfer 510 to the coherent interconnect. In addition, the processing unit 1 will then change the state of its copy from unique to shared. The shared copy will then be returned via the transfer 515 to processing unit 0, which will then allocate that copy into a cache line, and identify that cache line as shared. In addition, the local monitor will be set for the target address. An acknowledgement will then be sent via the transfer 520.

When processing unit 0 then subsequently executes a store exclusive instruction, then this will result in the issuance of a clean unique exclusive request 525 to the coherent interconnect. However, when adopting the FIG. 7 approach, this clean unique exclusive request will fail, as the global monitor will not be set for processing unit 0. Accordingly, a fail response 530 will be sent to the processing unit 0 and acknowledged via the transfer 535. During this process, the global monitor will then be set for processing unit 0, as per step 310 of FIG. 7.

The entire exclusive sequence will then be re-executed by the processing unit 0. This time there will be a hit in the cache when performing the load exclusive operation, and accordingly a coherent read request will not need to be re-issued. When the store exclusive instruction is subsequently encountered, then a further clean unique exclusive request 540 will be issued to the coherent interconnect. This time, the clean unique exclusive request will pass, as the global monitor will be set for processing unit 0. A snoop invalidation request 545 will then be sent to processing unit 1 to invalidate its copy, and an acknowledgement 550 will be returned to the coherent interconnect. If processing unit 1's copy is marked as dirty, then the invalidation in response to the snoop invalidation request 545 may also involve writing of the data back to memory.

A pass response 555 is then issued to processing unit 0, allowing it to perform a local update in its cache in order to successfully complete execution of the store exclusive instruction, with the state then being set to unique and dirty. An acknowledgement 560 will then be returned to the coherent interconnect. As will be seen from FIG. 10, this process has effectively involved three passes through the coherent interconnect to deal with the three system level transactions, namely the coherent read request transaction, the first clean unique exclusive request transaction which failed, and the second clean unique exclusive transaction which passed. This has happened even though there was not in fact any contended access, and accordingly there was no need for the first clean unique exclusive transaction to fail.

Figure 11:
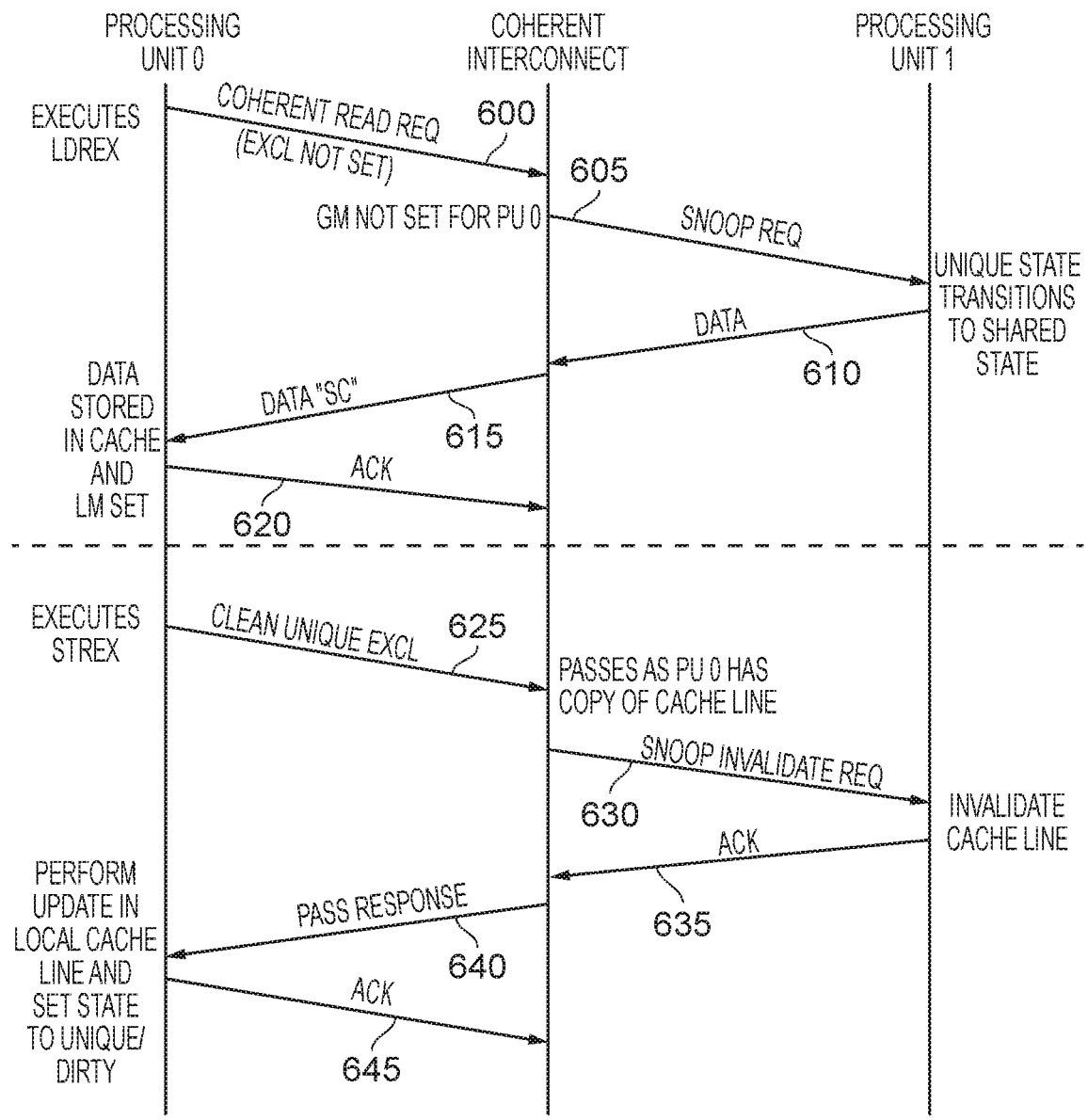
FIG. 11 illustrates a sequence of transactions between a processing unit and the coherent interconnect in the absence of contention, when using the FIG. 8 approach for the handling of the clean unique exclusive request, in accordance with one example arrangement.

As will be observed with reference to FIG. 11, when instead adopting the approach of FIG. 8, the same process reduces to two passes. The transfers 600, 605, 610, 615, 620 to process the coherent read request are identical to the transfers 500, 505, 510, 515, 520 discussed earlier with reference to FIG. 10.

However, when the store exclusive instruction is subsequently processed, resulting in the clean unique exclusive request 625, then when adopting the approach of FIG. 8, this clean unique exclusive passes since the snoop lookup performed at step 355 of FIG. 8 will determine that the processing unit 0 still has a copy of the cache line. Accordingly, a snoop invalidate request 630 is sent to processing unit 1, resulting in the acknowledgement 635, and then a pass response 640 is sent to processing unit 0 resulting in the acknowledgement signal 645. The transfers 630, 635, 640, 645 are identical to the earlier discussed transfers 545, 550, 555, 560 of FIG. 10. In this example, it will be seen that there are just two system level transactions required, namely the first transaction to deal with the coherent read request, and the second transaction to deal with the successful clean unique exclusive request. Hence, the false fail that occurred when using the approach of FIG. 10 is now removed, this resulting in significant performance improvements.

Figure 12:
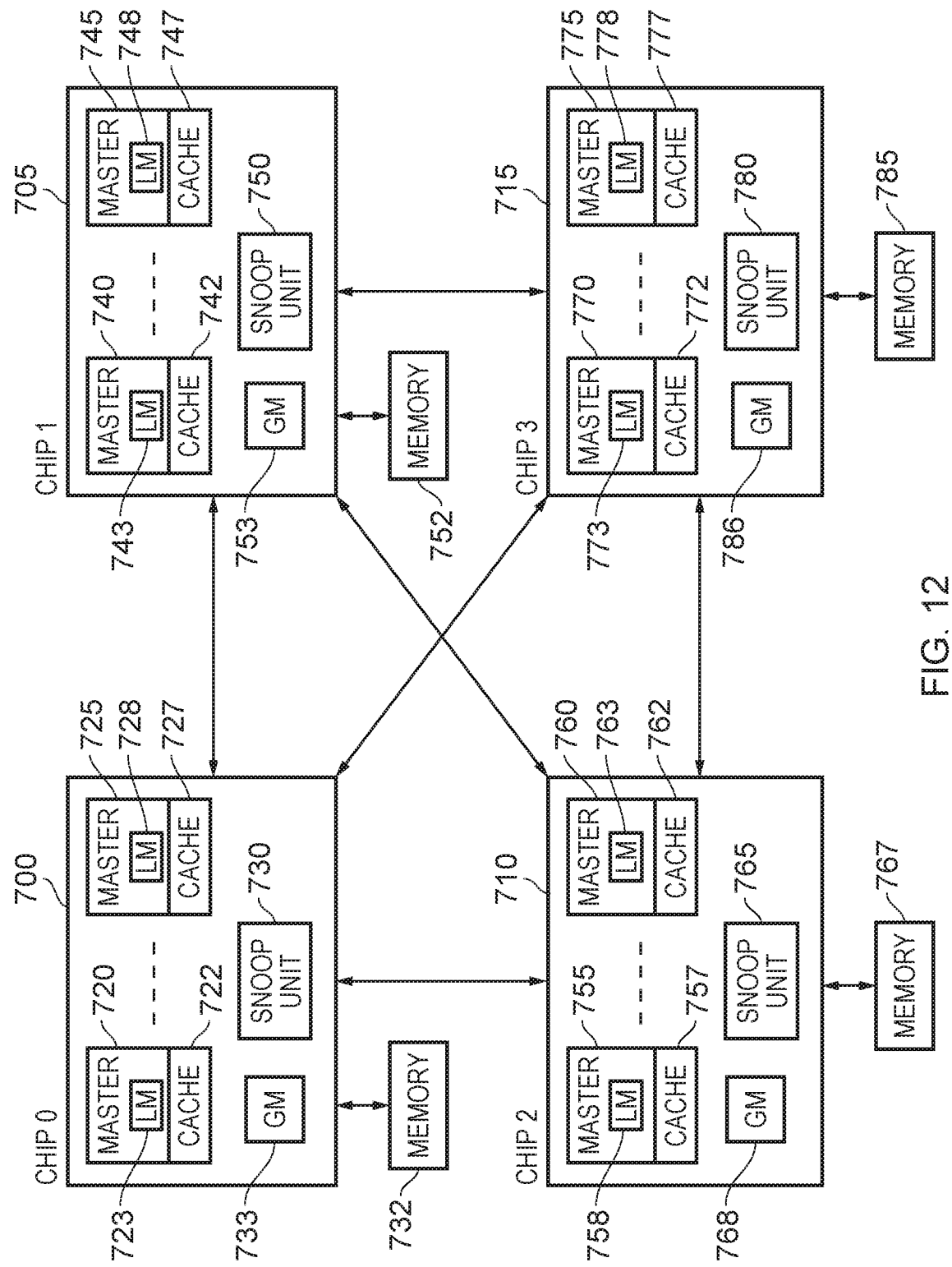
FIG. 12 is a diagram illustrating a system in accordance with an alternative example arrangement.

In the earlier discussed FIG. 1, it was assumed that all of the master devices were connected to a uniform interconnect using a single snoop unit and global monitor. However, alternative configurations can also be employed, whilst utilising the techniques described herein. One such example is shown in FIG. 12, where the system is comprised of multiple chips 700, 705, 710, 715, each of which has associated memory 732, 752, 767, 785. The coherent interconnect is formed by the interconnect circuitry within each individual chip (not explicitly shown in the figure), and interconnections between the various chips as shown in FIG. 12.

Each chip comprises a plurality of master devices 720, 725, 740, 745, 755, 760, 770, 775, each having associated cache storage 722, 727, 742, 747, 757, 762, 772, 777. Each master device also has a local monitor 723, 728, 743, 748, 758, 763, 773, 778.

For each chip's memory, an associated snoop unit 730, 750, 765, 780, and an associated global monitor 733, 753, 768, 786 may be provided. When any of the master devices within the system issues an access request that requires a coherency operation to be performed, then that access request is forwarded to the snoop unit associated with the memory containing the memory address specified by that access request. Hence, purely by way of example, if the master device 720 within chip 0 700 issues such an access request, and the address specified is an address within the memory 752, then that request would be forwarded to the snoop unit 750 of chip 1 705.

The address also dictates which global monitor is used when processing the coherent read requests and clean unique exclusive requests discussed earlier. Hence, by way of example, it would be the global monitor 753 in chip 1 705 that would be referred to when processing such a request that specified an address within memory 752.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a plurality of processing units, where multiple processing units of the plurality have associated cache storage;
a coherent interconnect used to couple the plurality of processing units with a memory, the coherent interconnect comprising a snoop unit used to implement a cache coherency protocol when a request received by the coherent interconnect identifies a cacheable memory address within the memory; and
contention management circuitry used to control contended access to a memory address by two or more processing units within the plurality of processing units;
the coherent interconnect being arranged to receive, from a first processing unit having an associated cache storage, an ownership upgrade request specifying a target memory address, the ownership upgrade request indicating that a copy of data at the target memory address, as held in a shared state in the first processing unit's associated cache storage at a time the ownership upgrade request was issued, is required to have its state changed from the shared state to a unique state prior to the first processing circuitry performing a write operation to the data;
the coherent interconnect being arranged to process the ownership upgrade request by referencing the snoop unit in order to determine whether the first processing unit's associated cache storage is identified as still holding a copy of the data at the target memory address at a time the ownership upgrade request is processed, and in that event to identify a pass condition for the ownership upgrade request independent of information held by the contention management circuitry for the target memory address;
wherein when, during processing of the ownership upgrade request by the coherent interconnect, the snoop unit determines that the first processing unit's associated cache storage no longer holds a copy of the data at the target memory address, the coherent interconnect is arranged to identify a fail condition for the ownership upgrade request independent of information held by the contention management circuitry for the target memory address.

2. An apparatus as claimed in claim 1, wherein in the presence of the pass condition, the coherent interconnect is arranged:
to cause the snoop unit to issue an invalidating snoop request to each processing unit, other than the first processing unit, that is identified by the snoop unit as holding a copy of the data at the target memory address, in order to cause each processing unit receiving the snoop invalidate request to invalidate the copy of the data as stored in its associated cache storage; and
to issue a response to the first processing unit identifying the pass condition so as to cause the first processing unit to update the state of the copy of the data held in its associated cache storage from the shared state to the unique state.

3. An apparatus as claimed in claim 2, wherein the first processing unit is further responsive to the response identifying the pass condition to perform the write operation to the copy of the data held in its associated cache storage.

4. An apparatus as claimed in claim 1, wherein:
the snoop unit comprises snoop filter storage having a plurality of entries, each snoop filter entry being arranged to identify a memory portion, and to maintain snoop control information indicative of the processing units that have accessed that memory portion; and
when the snoop unit is referenced by the coherent interconnect during processing of the ownership upgrade request, the snoop unit is arranged, when the target memory address is within the memory portion associated with a snoop filter entry, to reference the snoop control information in that snoop filter entry when determining whether the first processing unit's associated cache storage is identified as still holding a copy of the data at the target memory address.

5. An apparatus as claimed in claim 4, wherein the snoop control information for each snoop filter entry uniquely identifies each processing unit that has accessed the associated memory portion.

6. An apparatus as claimed in claim 4, wherein when the snoop control information does not uniquely identify each processing unit that has accessed the associated memory portion, the snoop unit is arranged to issue a snoop query to the first processing unit in order to determine whether the first processing unit's associated cache storage still holds a copy of the data at the target memory address.

7. An apparatus as claimed in claim 1, wherein:
the first processing unit is arranged to execute a plurality of instructions defining an exclusive sequence of operations that includes loading data into the associated cache storage and performing the write operation to that data provided that the data is held in the associated cache storage in the unique state at the time the write operation is performed, whereas in the event that the data is held in the associated cache storage in a state other than the unique state at the time the write operation is to be performed the exclusive sequence of operations fails, requiring the plurality of instructions to be re-executed.

8. An apparatus as claimed in claim 1, wherein:
the contention management circuitry comprises local monitor circuitry provided for each processing unit; and
when data is loaded into the associated cache storage of a processing unit in response to a coherent read request being processed by the coherent interconnect, the local monitor circuitry for that processing unit is arranged to set an entry within the local monitor circuitry to provide a memory address indication for the loaded data.

9. An apparatus as claimed in claim 8, wherein:
when data held in the associated cache storage of a processing unit is invalidated, the local monitor circuitry for that processing unit is arranged to clear any entry within the local monitor circuitry having the memory address indication for that data.

10. An apparatus as claimed in claim 8, wherein:
the contention management circuitry further comprises global monitor circuitry provided in association with the coherent interconnect; and
when a coherent read request from one of the processing units is processed by the coherent interconnect, and that coherent read request is flagged as being issued in relation to an exclusive sequence of operations performed by that one of the processing units, the global monitor circuitry is arranged to set an entry within the global monitor circuitry to identify that one of the processing units and a target memory address specified by the coherent read request.

11. An apparatus as claimed in claim 10, wherein, under one or more specified conditions, the coherent read request from a processing unit is not flagged as being issued in relation to an exclusive sequence of operations performed by that processing unit, despite the fact that data loaded into the associated cache storage of the processing unit as a result of the coherent read request will be the subject of a write operation during performance of the exclusive sequence of operations.

12. An apparatus as claimed in claim 10, wherein:
when the fail condition is identified, the coherent interconnect is arranged to notify the first processing unit of that fail condition; and
the global monitor circuitry is arranged to set an entry within the global monitor to identify the first processing unit and the target memory address.

13. An apparatus as claimed in claim 1, wherein the contention management circuitry is arranged to prevent a livelock condition arising when two or more processing units within the plurality of processing units are seeking contended access to a memory address.

14. An apparatus as claimed in claim 1, wherein one or more of the processing units are provided by separate processor cores.

15. A system as claimed in claim 1, wherein one or more of the processing units are provided by separate threads on a multi-threaded processor core.

16. An apparatus comprising:
a coherent interconnect used to couple a plurality of processing units with a memory, multiple processing units of the plurality having associated cache storage;
a snoop unit used to implement a cache coherency protocol when a request received by the coherent interconnect identifies a cacheable memory address within the memory; and
the coherent interconnect being arranged to receive, from a first processing unit having an associated cache storage, an ownership upgrade request specifying a target memory address, the ownership upgrade request indicating that a copy of data at the target memory address, as held in a shared state in the first processing unit's associated cache storage at a time the ownership upgrade request was issued, is required to have its state changed from the shared state to a unique state prior to the first processing circuitry performing a write operation to the data;
the coherent interconnect being arranged to process the ownership upgrade request by referencing the snoop unit in order to determine whether the first processing unit's associated cache storage is identified as still holding a copy of the data at the target memory address at a time the ownership upgrade request is processed, and in that event to identify a pass condition for the ownership upgrade request independent of information held by contention management circuitry for the target memory address, the contention management circuitry being used to control contended access to a memory address by two or more processing units within the plurality of processing units;
wherein when, during processing of the ownership upgrade request by the coherent interconnect, the snoop unit determines that the first processing unit's associated cache storage no longer holds a copy of the data at the target memory address, the coherent interconnect is arranged to identify a fail condition for the ownership upgrade request independent of information held by the contention management circuitry for the target memory address.

17. A method of operating an apparatus that has a plurality of processing units, where multiple processing units of the plurality have associated cache storage, and a coherent interconnect used to couple the plurality of processing units with a memory, comprising:
employing a snoop unit within the coherent interconnect to implement a cache coherency protocol when a request received by the coherent interconnect identifies a cacheable memory address within the memory;
employing contention management circuitry to control contended access to a memory address by two or more processing units within the plurality of processing units;
receiving at the coherent interconnect, from a first processing unit having an associated cache storage, an ownership upgrade request specifying a target memory address, the ownership upgrade request indicating that a copy of data at the target memory address, as held in a shared state in the first processing unit's associated cache storage at a time the ownership upgrade request was issued, is required to have its state changed from the shared state to a unique state prior to the first processing circuitry performing a write operation to the data; and
processing the ownership upgrade request by referencing the snoop unit in order to determine whether the first processing unit's associated cache storage is identified as still holding a copy of the data at the target memory address at a time the ownership upgrade request is processed, and in that event identifying a pass condition for the ownership upgrade request independent of information held by the contention management circuitry for the target memory address;
wherein when, during processing of the ownership upgrade request, the snoop unit determines that the first processing unit's associated cache storage no longer holds a copy of the data at the target memory address, identifying a fail condition for the ownership upgrade request independent of information held by the contention management circuitry for the target memory address.

* * * * *